Figure 1:
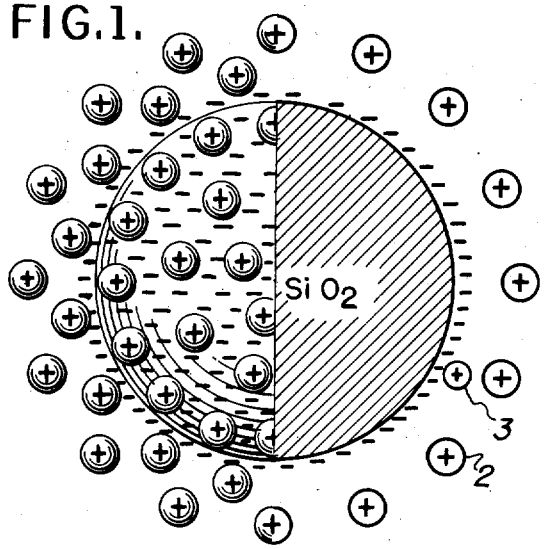

Feb. 2, 1954

R. K. ILER 2,668,149

STABILIZATION OF SILICA SOLS WITH
LITHIUM HYDROXIDE AND PRODUCT
Filed Dec. 3, 1951

INVENTOR.
Ralph K. Iler
BY
*Albert B. Griggs &
Fred C. Carlson*
ATTORNEYS

Patented Feb. 2, 1954

2,668,149

UNITED STATES PATENT OFFICE 2,668,149

STABILIZATION OF SILICA SOLS WITH LITHIUM HYDROXIDE AND PRODUCT

Ralph K. Iler, Wilmington, Del., assignor to E. I. du Pont de Nemours and Company, Wilmington, Del., a corporation of Delaware Application December 3, 1951, Serial No. 259,688

8 Claims. (Cl. 252—313)

This invention relates to silica sols stabilized with lithium ions and to processes for preparing such sols.

Figure 2:
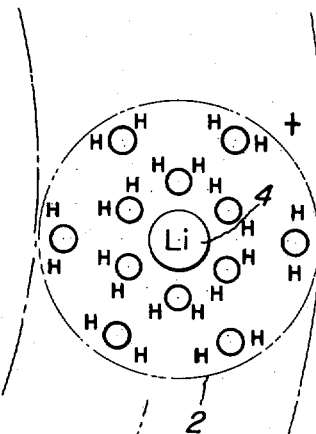
Figure 2:
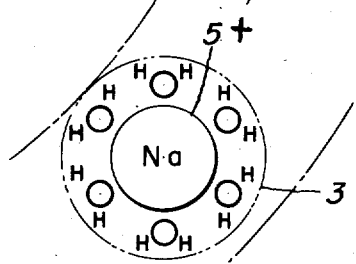
Figure 3:
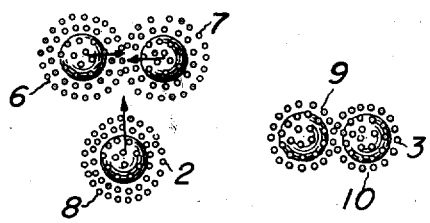
Figure 4:
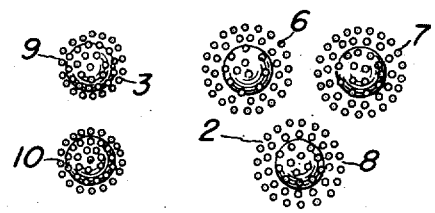

In the drawings:

Figure 1 is a semi-diagrammatic illustration partly in section of a typical silica particle stabilized with lithium ions according to the invention, and Figure 2 is a detailed showing of a single hydrated lithium ion from the ring shown in Figure 1, and Figure 3 illustrates typical particles of silica in a sol stabilized according to the invention, and Figure 4 illustrates a modification in which similar particles are stabilized in the presence of an organic material.

Referring to the processes and products of the invention in general terms, reference may first be had to Figures 1 and 2 of the drawings. In Figure 1 there is illustrated a typical silica sol particle 1. As will be explained hereinafter these particles are preferably treated with lithium hydroxide. When a sol is so treated, the sol containing substantially no sodium or potassium or other alkali metal, the sol first forms a gel. This redisperses spontaneously after a few hours.

As shown in Figure 1 the particles in the sol thus produced can be visualized as surrounded by a shell of diffusely charged, hydrated lithium ions illustrated at 2. A single hydrated sodium ion is similarly illustrated at 3.

This shell of surrounding, hydrated lithium ions is illustrated in more detail in Figure 2 where a single lithium ion with its associated water groups is shown in comparison with a similar hydrated sodium ion.

Referring more specifically then to Figure 2 the lithium ion 4, illustrated by a circle, is shown surrounded by water molecules. The sodium ion 5 is similarly shown.

The lithium ion itself, 4, is smaller than the sodium ion 5. It therefore has a greater polarizing effect upon the water molecules surrounding it so that the overall diameter of the hydrated lithium ion 2 is greater than the overall diameter of the hydrated sodium ion 3. The positive charge on each ion is distributed over the whole of each hydrated ion. Thus, in spite of the fact that the lithium ion is smaller, it is believed that the over-all diameter of the hydrated ion is actually larger because more water molecules are held in close association with the lithium ion than with the sodium ion. As a consequence, and as shown in Figure 1, the counter positively charged hydrated lithium ions are held somewhat further away from the surface of the silica particle than the hydrated sodium ions. Thus, effectively, the repulsion between adjacent charged particles such as those shown in Figure 1 and surrounded with hydrated lithium molecules is greater than would be the case if the particles were surrounded by hydrated sodium ions.

It will be understood that while the ions are represented in Figure 2 as surrounded on a plane by water molecules, the disposition is actually three dimensional. The representation is shown as it is in the figure for convenience.

Figure 3 illustrates a number of silica particles in an aquasol and illustrates the spherical field of hydrated lithium ions at 6, 7, and 8. The particles tend to remain separated in the sol and not to coagulate because being charged with like negative charges of considerable strength they are repelled, each by the other. The similar particles shown at 9 and 10 are illustrated as surrounded with fields of hydrated sodium ions. Here the negative charges are smaller and the particles are illustrated as coming together to form a gel.

In Figure 4 there is illustrated a similar sol of the invention in a medium which contains both water and an organic liquid such as ethyl alcohol. The particles 6, 7, and 8, despite the change of dielectric constant, still maintain the spherical fields of hydrated lithium particles. These fields are driven towards the silica particle somewhat because of the change in dielectric constant. Particles 9 and 10 illustrate similar silica particles having a field of hydrated sodium ions. This field is driven closer to the silica particle, destroying the negative charge on the colloidal particles and causing the particles to come together and to form gels or precipitates.

It will be understood that in the drawings the particles, the ions, and the chemical symbols are shown diagrammatically and without any effort to maintain a true scale. It will also be understood that the silica particles are merely illustrative, though in preferred sols of the invention the particles will be substantially spherical and will present substantially the uniform diameters and unagglomerated character of those illustrated in Figures 3 and 4.

It will be further understood that while the action of lithium has been described as attributable to the hydration of the lithium and the formation of a force-sphere about the silica particle, this represents merely the best theory now available to conform to observe facts. It is entirely possible that the observed phenomena could be nearly as well explained by referring to the coordination powers of the respective ions, lithium having a much greater ability to coordinate. In any event it is not intended that the invention be limited by the explanation of the mechanism as described.

Considering the invention in greater detail the stabilized sols prepared according to the invention are preferably made beginning with a silica sol of conventional character. The silica sols may contain particles having an average diameter from, say, about one millimicron up to the upper limits of colloidal size, say about 150 millimicrons. It is, however, preferred to use sols in which the particles average from about 5 to 25 millimicrons.

Sols suitable for use according to the invention may be prepared, for example, as shown in the Bird U. S. Patent 2,244,325 or the Voorhees Patent 2,457,971. The products prepared as described by these patents will ordinarily contain particles having an average size ranging downwardly from about 8 to 10 millimicrons. Suitable sols can also be made by the reaction of alkali metal silicates and acids such as sulfuric, hydrochloric, sulfamic and the like under conditions which produce sols according to prior art practices. Sols as thus prepared will, of course, contain salts which must be removed by conventional methods, such as by the use of ion-exchange resins or by dialysis.

If it is desired to use sols containing particles of larger diameter, then these may conveniently be prepared by processes described in the Bechtold and Snyder application, Serial No. 65,536, filed December 5, 1948, issued November 13, 1951 as U. S. Patent 2,574,902. Sols as thus prepared have a larger particle diameter because a starting sol is used as a heel and silica is built up upon its particles by the addition of further quantities of the active silica at an elevated temperature.

In considering the suitability of a particular sol for use in processes of the invention, the particle size can readily be determined as described in the Bechtold and Snyder application above cited by examination using the electron microscope or by light scattering. For the smaller particle sizes which are difficult to determine with the electron microscope the light scattering method will be found preferable.

A still further way of determining the suitability of sols for use according to the invention with respect to the particle size of the silica contained is by a depolymerization method.

The amount of monomer in a particular solution may be determined by measuring the amount of color developed with molybdic acid. It was shown by Harman (J. Phys. Chem., vol. 31, 616–25 (1927)) that yellow silico-molybdic complex acid is formed by reaction of molybdic acid with ionic or "crystalloidal silica" but not with colloidal silica. This observation has been confirmed, and it has been concluded that only monosilica acid forms the yellow complex with molybdic acid. Hence, the rate of depolymerization of silica in the dilute alkaline test solution can be followed over a period of time by taking samples and determining the amount of monomer present.

Specifically, the depolymerization test is carried out by adding the silica sol sample to such quantity of a dilute solution of sodium hydroxide that the pH of the mixture is about 12 (corresponding to 0.01 normality of alkali) and the total concentration of $SiO_2$ is 0.02%. This mixture is held at 30° C. for a measured time after preparation, and then tested for monomer. Five ml. of the depolymerizing solution are mixed with 45 ml. of a molybdic acid reagent made up of diluting 25 ml. of 1 N sulfuric acid and 10 ml. of 10% (by weight) ammonium molybdate solution to a total of 225 ml. The molybdic acid reagent is sufficiently acidic to stop the depolymerization of silica in the test sample. Thus, the time interval of depolymerization is taken as the time between the mixing of the silica sample with sodium hydroxide solution and neutralization of this solution with molybdic acid reagent. The color developed in the depolymerizing solution and the molybdic acid reagent at 30° C. is measured with a Model DU Beckman photoelectric quartz spectrophotometer at a wave length of 400 millimicrons. The color reading is taken after about two minutes, since the reaction of monomeric silicic acid with molybdic acid is essentially complete in that time. The amount of monomeric silica corresponding to this color is determined by standardizing the color against a known amount of sodium orthosilicate.

Silica sols which are broadly useful for purposes of the invention will preferably be completely depolymerized in not less than thirty minutes by the depolymerization test as described. It is preferred to use sols which will depolymerize completely in not less than about 100 minutes.

Sols used according to the invention may have any concentration. It will be observed that, in general, the smaller the particle size the less stable the sol. Sols of quite high concentration prepared according to Bechtold and Snyder may be employed.

Sols used according to the invention should be substantially free of alkali metal ions other than lithium. If the sols have been stabilized with such alkali metal ions or contain appreciable amounts of salt impurities these can be removed by contacting the sols with ion exchange resins or by dialysis.

Sols of great purity which can be used as starting materials are described in the U. S. application of Joseph M. Rule, Serial No. 183,902, filed September 8, 1950, issued December 4, 1951, as U. S. Patent 2,577,485. This application specifically described suitable cation- and anion-exchangers. This application shows the preparation of sols free from electrolytes with the addition of traces of alkali metals to effect restabilization. Sols as there prepared by cation and anion exchange are quite suitable for use according to the invention, therefore, prior to the addition of the alkali metal.

It has been specifically observed that alkali metal ions should be absent and it is further to be noted that anions, other than hydroxyls, should also be absent. Thus the presence of any considerable amount of sulfates, chlorides or the like tends towards the production of products of lowered stability. As just previously noted, the anions can be removed by the use of suitable anion-exchangers such as those shown in the Rule application, or by dialysis, or by other suitable means.

It is accordingly to be noted that it is preferred that sols treated according to the invention contain no more than about 0.2 per cent by weight of the total sol of water soluble impurities.

Instead of using sols of the character above described, gels may be employed. Suitable silica gels may be made, for example, simply by the reaction of an alkali metal silicate with an acid such as sulfuric, hydrochloric or the like. The gels may then be freed from salts and impurities by conventional washing techniques or by dialysis. The preparation of gels of such a character is shown in the White patent, 2,375,738. It is noted, incidentally, that this patent shows the preparation also of sols which, while not of the preferred type for use according to the invention, can nevertheless be used.

According to processes of the invention, lithium hydroxide is added to the starting sol or gel. When lithium hydroxide is thus added to a sol, a precipitate is formed. The viscosity of the sol at once increases. If the sol is fairly concentrated with respect to silica, say containing 30 per cent $SiO_2$, it will set up to a firm gel. After a time the viscosity of dilute solutions, and of the gel in the case of more concentrated solutions, spontaneously reverts to a very fluid state which is a stable silica sol of the present invention.

The lithium hydroxide should be added to a silica sol, according to the invention, in such an amount that the $SiO_2:Li_2O$ ratio is from about 4:1 to 25:1. At a ratio below 4:1 it is simple to prepare ionic solutions of alkali metal silicates. At a mol ratio greater than 4:1, however, the alkali metal silicates are insoluble. At a mol ratio greater than 4:1, as used according to the invention, the products are present as sols containing particles of colloidal dimensions. The ratio may be increased and the advantages of the invention become increasingly less as a ratio of about 25:1 is reached. Much above this figure sols which are relatively stable can be made using sodium or potassium. It is specifically to be noted that the greatest advantages of the invention are obtained when the $SiO_2:Li_2O$ mol ratio is from about 10:1 to 20:1.

The sol should be subjected to vigorous agitation while the lithium hydroxide is added to hasten the distribution of the ion through the solution. After the sol has reached a maximum viscosity further agitation is not necessary and is not especially advantageous.

While as has been observed above the starting sol may have any concentration, it is quite desirable that the sol as produced contain from about, say 1 per cent to 30 per cent $SiO_2$. Sols containing much less than about 1 per cent will be so dilute as to be difficult and uneconomic to handle. Above about 30 per cent the sols will be increasingly unstable and will tend to gel. It is to be noted that if the starting sol is more concentrated with respect to $SiO_2$, water can be added either before, during or after addition of the lithium hydroxide. It is especially preferred to use such a quantity of water as will result in the sol containing from about 5 to 20 per cent $SiO_2$.

It is to be observed of concentration that the sols are increasingly more stable as the particles are larger. If a sol is to be prepared containing as high as, say 30 per cent $SiO_2$ the particles should be quite large and should have, for example, an average diameter of about 20 millimicrons. On the other hand, if the particles in the sol are quite small and are of the order, say of 10 millimicrons the sols will preferably contain no more than about 15 per cent $SiO_2$, since otherwise they will not be entirely stable upon long standing.

The principal advantages of the invention are attained with sols which are comparatively concentrated since very dilute sols can be made using sodium. The advantages of the invention accordingly are most fully realized when the silica sols produced contain a molar concentration of $SiO_2$ greater than R/10 where R is the $SiO_2:Li_2O$ mol ratio. Since a one molar $SiO_2$ solution or sol contains 6 per cent of $SiO_2$, it will be seen that if the ratio of $SiO_2:Li_2O$ is 4:1 the greatest advantages of the invention will be obtained if that silica sol contains over 2 per cent of $SiO_2$. With a 15:1 ratio sol the $SiO_2$ content should be above about 9 per cent. With a 25:1 ratio sol the greatest advantages are attained if the sol contains at least 15 per cent of $SiO_2$.

The sols produced as above described should contain lithium ions in the proportions mentioned and preferably should not contain more than traces of other alkali metals. It is preferred that the sols contain no more than 0.2 per cent of water soluble impurities of any kind. The silica particles will contain small amounts of titanium and aluminum, for example, which are present as insoluble materials and are normally present in the sand from which silicates are made. The silica sols, however, can be said to contain no more than 0.2 per cent by weight of water soluble compounds other than lithium hydroxide or silicate.

When a gel is used according to the processes of the invention the procedure is much like that described above using sols. The ratio of the lithium hydroxide to the silica will be as already described. The pure gel will have additional water added as necessary and it can be agitated, for example, with lithium hydroxide to effect intimate contact. It is, of course, preferred in such a process to dissolve the lithium hydroxide in water before addition to the gel. The products obtained will be comparable to those obtained using sols, though they will not be as uniform or quite as stable and desirable in their characteristics.

The sols prepared according to the invention have the advantage of being rather strongly alkaline. They can be used in applications where the sodium ions of conventional sols are detrimental. They can be used, for example, in the preparation of catalysts. They can also be used in the treatment of leather, paper and textiles. They can also be used in the preparation of phosphors, and in adhesive compositions used for bonding phosphors or other materials, one to another.

The products will be found especially useful because of their compatibility with organic materials. They may be mixed with such water miscible organic liquids as acetone and other water soluble ketones. Other suitable water miscible liquids include aliphatic alcohols such as methyl, ethyl, propyl, butyl, and the like. They can also be used with dioxane, morpholine, and the lower liquid ethylene oxide polymers. Generally these products may be mixed with any water miscible or partly water miscible organic liquid which decreases the dielectric constant of water.

In order that the invention may be better understood the following specific illustrative example is given in addition to those generally described above:

*Example 1*

A colloidal silica sol prepared as in the Bechtold and Snyder application above cited was used. It contained 30.0 per cent $SiO_2$ and had an $SiO_2:Na_2O$ ratio of 90:1. The silica particles had an average particle diameter of 17 millimicrons and a specific surface area as determined by nitrogen adsorption on the dried silica of 190 square meters per gram.

This sol was deionized by contacting it with the hydrogen form of a sulfonated divinylbenzene-styrene copolymer cation-exchanger. This is sold commercially as "Nalcite HCR." The effluent from the cation-exchanger contained, in addition to the silica particles, considerable amounts of sulfuric and hydrochloric acids. These were removed by subsequently contacting the effluent with the hydroxyl form of an anion-exchanger. This was a metaphenylene diamine formaldehyde type of anion-exchanger as shown in the Ryzner Patent 2,438,230.

The effluent from the anion-exchanger had a specific resistance of six thousand ohms indicating that substantially all of the ionic impurities had been removed. The resulting sol contained 28.2 per cent $SiO_2$ and had a pH of 4.0. The sulfate content had been reduced to a value of 0.005 per cent and the sodium content was reduced to 0.003 per cent.

Lithium hydroxide monohydrate was dissolved in distilled water to give a solution containing 4.26 mols of LiOH per liter. 32.9 milliliters of the lithium hydroxide solution was added to 150 milliliters of the deionized sol as prepared above. The pH of the mixture was 11.7 and the mixture immediately set to a firm gel. This mixture remained gelatinous for a period of about 17 hours after which it spontaneously redispersed to a fluid sol.

The resulting sol had an $SiO_2:Li_2O$ ratio of 12:1 and analyzed 26.52 per cent $SiO_2$.

Example 2

A similar sol was made by adding 15.78 milliliters of the 4.26 normal lithium hydroxide solution prepared as above to 150 milliliters of a deionized silica sol prepared in Example 1. The pH of the resulting mixture was 11.9. The silica content was 26.52 $SiO_2$. The sol produced had an $SiO_2:Li_2O$ ratio of 25:1.

The mixture gelled immediately upon mixing and remained in the gelatinous state for a period of about 4 hours and thereafter it spontaneously repeptized to a fluid sol.

I claim:

1. A silica sol having an $SiO_2:Li_2O$ mol ratio of 4:1 to 25:1.

2. A silica sol of silica particles having an average diameter of 1 to 150 millimicrons, the mol ratio of $SiO_2:Li_2O$ in the sol being from 4:1 to 25:1.

3. A silica sol of silica particles having an average diameter of 5 to 25 millimicrons, the mol ratio of $SiO_2:Li_2O$ in the sol being 10:1 to 20:1, and the molar concentration of $SiO_2$ being greater than R/10 where R is the said mol ratio.

4. A silica sol of silica particles having an average diameter of 5 to 25 millimicrons, the mol ratio of $SiO_2:Li_2O$ in the sol being 10:1 to 20:1, the molar concentration of $SiO_2$ being greater than R/10 where R is the said mol ratio, sol containing no more than 0.2 per cent of water soluble compounds other than lithium hydroxide and silicate.

5. In a process for making a silica sol the step comprising contacting a silica gel which is substantially free from alkali metal ions other than lithium with lithium hydroxide in the mol ratio $SiO_2:Li_2O$ of 4:1 to 25:1 thereby to form a silica sol.

6. In a process for making a silica sol the steps comprising reacting an alkali metal silicate with acid to form a gel, removing salts from said gel, and contacting said gel with lithium hydroxide in the mol ratio $SiO_2:Li_2O$ of 4:1 to 25:1 thereby to form a silica sol.

7. In a process for making a lithium-stabilized silica sol from a silica sol containing an alkali metal other than lithium, the steps comprising removing said metal from said sol, mixing lithium hydroxide with said sol in a proportion such that the $SiO_2:Li_2O$ mol ratio is from 4:1 to 25:1 thereby to form a gel which thereafter spontaneously reverts to a sol.

8. In a process for making a lithium-stabilized silica sol from a silica sol of silica particles having an average diameter between 5 and 25 millimicrons and containing an alkali metal other than lithium, the steps comprising removing said metal from said sol, removing anionic impurities so that the sol contains no more than 0.2 per cent of water soluble inorganic compounds other than lithium hydroxide and silicate, mixing lithium hydroxide with said sol in a proportion such that the $SiO_2:Li_2O$ mol ratio is from 10:1 to 20:1 thereby to form a gel which thereafter spontaneously reverts to a sol, the total amount of water present being such that the final molar concentration of $SiO_2$ in the sol is greater than R/10 where R is said mol ratio.

RALPH K. ILER.

References Cited in the file of this patent

UNITED STATES PATENTS

| Number | Name | Date |
|---|---|---|
| 2,244,325 | Bird | June 3, 1941 |